(12) United States Patent
Pritchard

(10) Patent No.: US 10,926,837 B2
(45) Date of Patent: Feb. 23, 2021

(54) SUBMERGED PLANING SURFACE THAT PROVIDES HYDRODYNAMIC LIFT IN A LIQUID AT HIGH SPEED

(71) Applicant: Shaun Pritchard, Eastsound, WA (US)

(72) Inventor: Shaun Pritchard, Eastsound, WA (US)

( * ) Notice: Subject to any disclaimer, the term of this patent is extended or adjusted under 35 U.S.C. 154(b) by 406 days.

(21) Appl. No.: 15/303,203

(22) PCT Filed: Apr. 3, 2015

(86) PCT No.: PCT/US2015/024215
§ 371 (c)(1),
(2) Date: Oct. 10, 2016

(87) PCT Pub. No.: WO2015/157101
PCT Pub. Date: Oct. 15, 2015

(65) Prior Publication Data
US 2017/0029071 A1    Feb. 2, 2017

Related U.S. Application Data

(60) Provisional application No. 62/049,867, filed on Sep. 12, 2014, provisional application No. 61/977,024, filed on Apr. 8, 2014.

(51) Int. Cl.
*B63B 1/24* (2020.01)
*B63H 1/18* (2006.01)
*B63H 1/26* (2006.01)
*B64C 25/32* (2006.01)

(52) U.S. Cl.
CPC ............... *B63B 1/248* (2013.01); *B63H 1/18* (2013.01); *B63H 1/26* (2013.01); *B64C 25/32* (2013.01); *B63H 2001/185* (2013.01)

(58) Field of Classification Search
CPC ..... B63B 1/248; B63B 1/288; B63B 2745/00; B63B 2746/00; B64C 25/18; B64C 25/32; B63H 1/26; B63H 20/26; B63H 2001/185; B63H 1/18
USPC ........ 114/39.15, 29.24, 55.54, 274, 278–282
See application file for complete search history.

(56) References Cited

U.S. PATENT DOCUMENTS

| | | | | |
|---|---|---|---|---|
| 2,274,200 A | * | 2/1942 | Hill .................. | B63B 1/248 114/274 |
| 2,306,953 A | * | 12/1942 | Ingvar ............... | F01K 23/16 416/28 |
| 3,077,173 A | * | 2/1963 | Lang ................. | B63B 1/248 114/278 |
| 3,099,239 A | * | 7/1963 | Von Schertel ..... | B63B 1/30 114/282 |
| 3,213,818 A | * | 10/1965 | Barkley ............. | B63B 1/30 114/275 |
| 3,221,698 A | * | 12/1965 | Turner .............. | B63B 1/288 114/278 |
| 3,788,267 A | * | 1/1974 | Strong .............. | B63H 1/18 416/93 R |

(Continued)

*Primary Examiner* — William V Gilbert

(57) ABSTRACT

One embodiment of submerged blades (101) that provide hydrodynamic force to a vessel or aircraft (117) that can lift it above the surface of the water (106) at high speed by creating thrust with a single wetted high pressure surface (111), the low pressure surface (112) being covered with a gas filled void in the liquid, thus preventing sudden loss of lift as speed increases due to cavitation or surface venting. Other embodiments are described and shown.

18 Claims, 10 Drawing Sheets

(56) References Cited

U.S. PATENT DOCUMENTS

| | | | | |
|---|---|---|---|---|
| 4,975,023 | A * | 12/1990 | Miura | B63H 1/26 416/237 |
| 5,054,410 | A * | 10/1991 | Scarborough | B63B 1/12 114/275 |
| 5,083,950 | A * | 1/1992 | Suhrbier | B63H 1/28 440/66 |
| 5,471,942 | A * | 12/1995 | Miller | B63B 1/248 114/274 |
| 5,551,369 | A * | 9/1996 | Shen | B63B 1/248 114/274 |
| 6,167,829 | B1 * | 1/2001 | Lang | B63B 1/248 114/272 |
| 6,467,422 | B1 * | 10/2002 | Elms | B63B 1/248 114/274 |
| 7,275,493 | B1 * | 10/2007 | Brass | B60V 1/08 114/272 |
| 2015/0144049 | A1 * | 5/2015 | Daley | B63B 1/26 114/274 |

* cited by examiner

SUBMERGED PLANING SURFACE THAT PROVIDES HYDRODYNAMIC LIFT IN A LIQUID AT HIGH SPEED

CROSS-REFERENCED TO RELATED APPLICATION

This application claims the benefit of PPA Ser. No. 61/977,024, filed 2014 Apr. 8, PPA Ser. No. 62/049,867 filed 2014 Sep. 12 with the USPTO and PCT/US2015/024215 filed 2015 Apr. 3 by the present inventor.

FEDERALLY SPONSORED RESEARCH

None.

BACKGROUND

This invention relates to articles such as hydrofoils and other submerged lifting or thrusting articles such as, rudders, propeller blades, turbine blades, pump impeller blades and the like, that are required to produce hydrodynamic lift or thrust in a liquid by displacing the liquid through a movement of the article that creates lower pressure in the liquid on one side of the article and higher pressure on the other side.

More explicitly, the liquid is essentially displaced by both sides, being pressed into a new position on the high-pressure side and sucked it into a new position on the low pressure side by the movement of the article. The difference in pressure created by the force needed to accelerate the mass of the liquid in the process of displacing it, is what provides the required hydrodynamic lifting or thrusting force on the article in the opposite direction.

However, the low pressure sides of such articles are prone to at least two phenomena that can suddenly and dramatically reduce the hydrodynamic lifting or thrusting ability of these articles as the speed of the movement is increased:

1. Firstly, the low pressure side can develop "cavitation", which is the phenomenon of the liquid turning to gas, or boiling, due to substantially reduced pressure, caused by the liquid's inability to accelerate fast enough to occupy the space behind the passing article (also referred to as "inertial cavitation"). The boiling of the liquid consumes a large amount of energy that is released when the bubbles of gas collapse, producing tiny points of intense heat (hot enough to melt steel), substantially impairing the materials of the articles they contact. It must be noted that this energy is sacrificial since it does not enhance the lifting properties of the article, and therefor produces drag. Furthermore, the bubbles disturb the displacement of the liquid on the low pressure side of the article and dramatically reduce the hydrodynamic lifting or thrusting force of the article.
2. Secondly, a further drawback in using such articles at or near the surface is the "surface venting" of the article. This is the phenomenon that occurs when the surface air is sucked down into the low pressure side of the article, also disturbing the displacement of the liquid on the low pressure side and dramatically reducing the hydrodynamic lifting or thrusting force of the article.

By this definition, cavitation and ventilation cannot happen at the same place at the same time.

SUMMARY

An improved method or apparatus for creating required hydrodynamic lift or thrust in a liquid at high speed with a blade or blades comprising a high_pressure wetted surface and a lower_pressure dry surface is presented. Each blade essentially contains only a high pressure surface in contact with the liquid, the lower pressure surface being substantially covered with an introduced gas, such as surface air, providing a blade that is essentially a single hydroplaning surface, below the liquid surface, moving in its own "bubble" or gas filled void in the liquid. This completely eradicates the sudden loss of hydrodynamic lift and drag caused by cavitation. It also eradicates the sudden loss of lift at high speed caused by surface venting, since the blade or blades vent at low speeds and are already fully vented by the time they reach high speed. The blade can be set to a higher angle of attack to compensate for the loss of lift or thrust due to the lower pressure surface not sucking down the liquid directly.

One possible embodiment of this invention is presented as a system or method of allowing high-speed aircraft to take off from, and alight on water using a retractable blade or blades attached below the aircraft.

Such an aircraft is able to float on water by displacing the water with wings or fuselage, and as forward speed increases, the deployed blade, or blades, present submerged surfaces that derive the required hydrodynamic lift from the high pressure surface alone to support the aircraft above the water.

All embodiments intentionally allow the surface air to be sucked down and delaminate the flow of water on the low pressure surface, with the high pressure surface having sufficient angle of attack to provide enough hydrodynamic lift to support and raise the aircraft to sufficient altitude above the surface, that the correct angle of attack and speed on the main flying wing of the aircraft is achieved to produce flight. Once airborne, the blade or blades can be retracted into the aircraft and do not present parasitic drag that can affect the aircraft's speed in flight.

While alighting on the water, the deployed blade or blades penetrate the surface as the aircraft descends, drawing down the air below the surface. The blades are immediately vented and thus impervious to cavitation, even at high speeds, while the angle of attack on the high pressure surface provides enough lift to support the aircraft as it slows and the wings produce less lift.

By using blades tapered toward the tip, the minimum amount of surface is wetted to provide required hydrodynamic lift, allowing a decrease in drag from wetted surface as speed is increased and the blades rise out of the water.

A deflector flange may also be used at the leading edge on the low pressure side to encourage introduction of gas at low speed or at a low angle of attack.

To assist in lifting or thrusting at low speeds, an embodiment may have part of the blade or blades shaped as a conventional non-cavitating and non-venting hydrofoil, and the angle of attack may be variable.

With any embodiment, the blade or blades may be flexible to account for an uneven surface of the liquid, such as waves or swell.

Another embodiment of this invention is presented where this type of blade allows high-speed watercraft to exceed the speed where cavitation of conventional hydrofoils is reached.

A further embodiment is a method of introducing a gas, such as exhaust gas or surface air, to the front or low pressure surface of a boat propeller, reducing or totally eliminating cavitation and the sudden loss of thrust incidental to surface venting.

DRAWINGS

Figure 1:
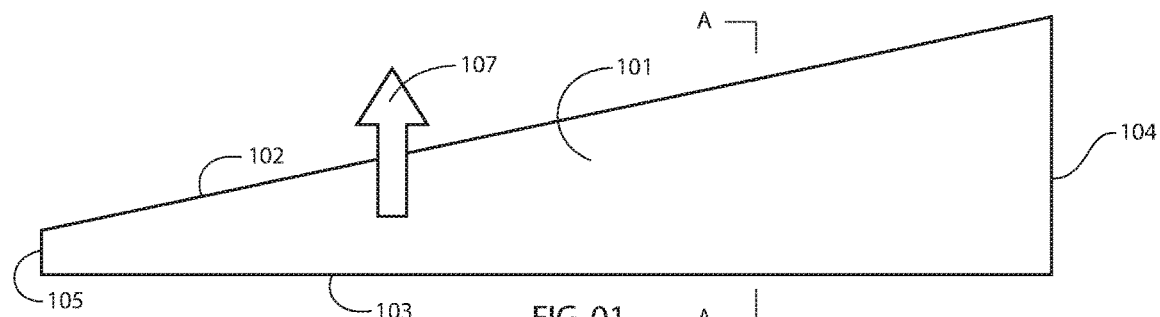
FIGS. 01-04 show planar view illustrations of various embodiments of blades in accordance with the invention.
Figure 2:
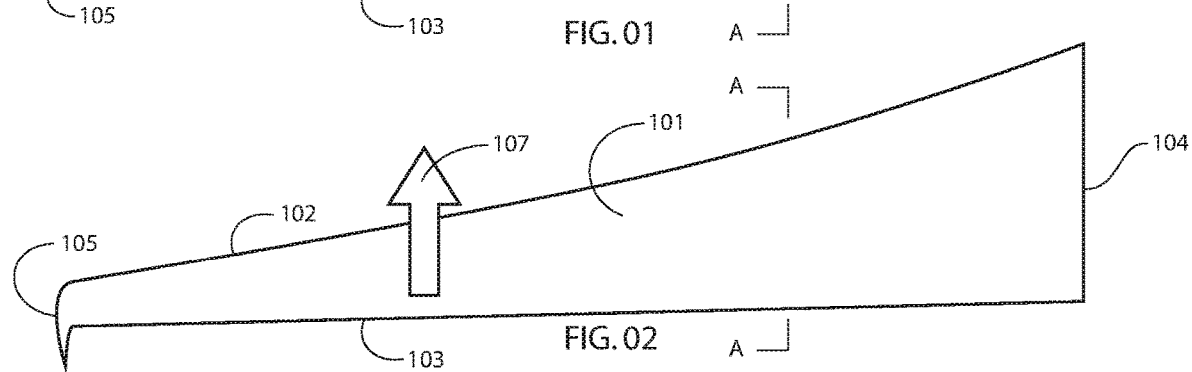
Figure 3:
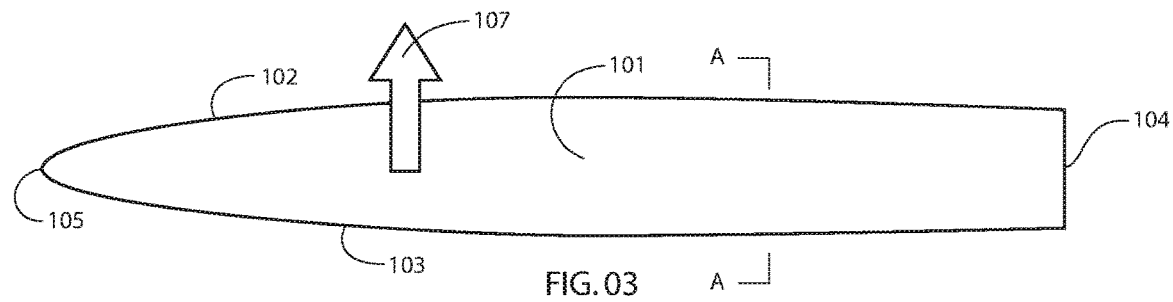
Figure 4:
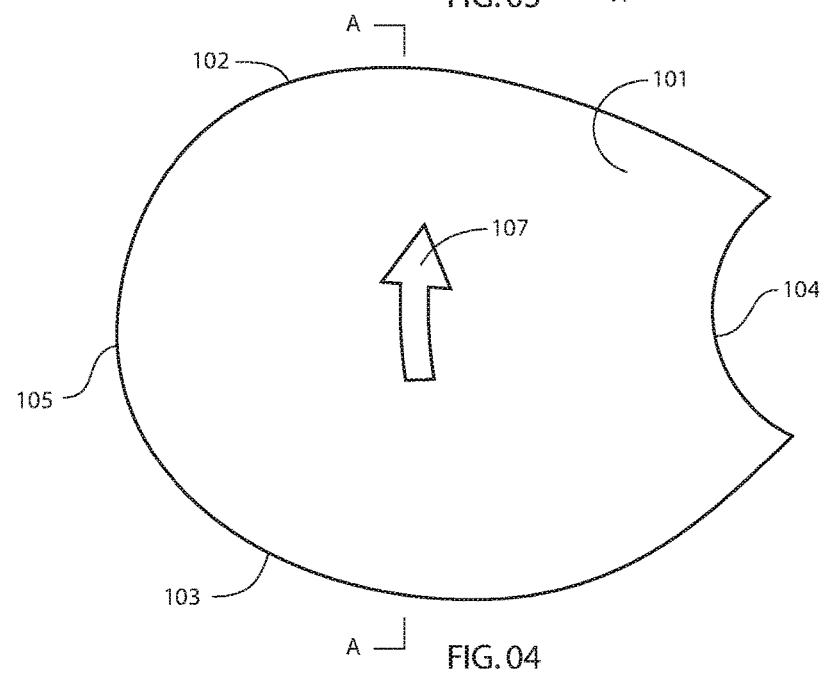

REFERENCE NUMERALS 101 blade
102 leading edge
103 trailing edge
104 base
105 tip
106 liquid
107 general direction of blade movement through liquid
108 general direction of liquid acceleration due to blade movement
109 general direction of thrust
110 angle of attack
111 bottom or high pressure wetted surface of blade
112 top or low or ambient pressure dry surface of blade
113 gas
114 void in liquid surrounding gas and blade
115 flange
116 increased thickness
117 vehicle such as aircraft or watercraft, or object such as propeller hub
118 chine
119 gas passage
120 bend
121 surface of liquid
122 chord or width of blade
123 reference base plane
124 reference centerline plane

DETAILED DESCRIPTION

As required, detailed embodiments of the present invention are disclosed herein; however, it is to be understood that the disclosed embodiments are merely exemplary of the invention that may be embodied in various and alternative forms. Specific structural and functional details, and shapes disclosed herein are not to be interpreted as limiting, but merely as a basis for the claims and as a representative basis for teaching one skilled in the art to variously employ the present invention.

Description—FIGS. 01 Through 04

Some examples of the many such possible embodiments are shown in FIGS. 01 through 04 where planar views of the embodiments show blade 101 with leading edge 102 and trailing edge 103, and base 104 and tip 105, moving in direction 107.

Operation—FIGS. 01 Through 04

To operate such embodiments, blade 101 is moved through liquid 106 (not shown) as depicted by movement 107.

Figure 5:
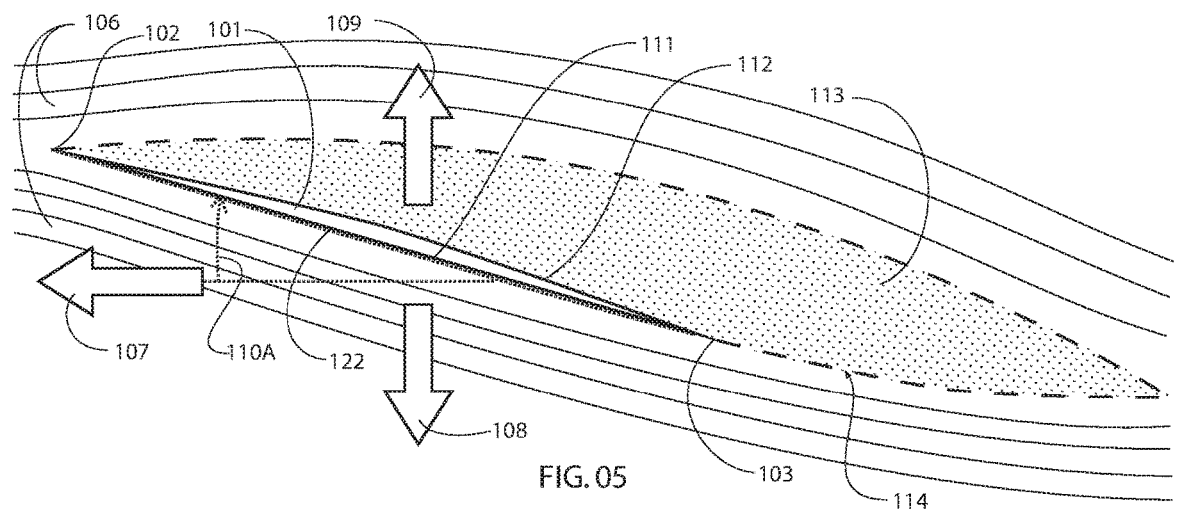
FIGS. 05-07 show a typical cross section illustrations at "A" of the typical embodiments shown in FIGS. 01 through 04.

Description—FIG. 05

FIG. 05 shows a typical cross section at "A" of blade 101 of the typical embodiments shown in FIGS. 01 through 04, where-cross section at "A" is submerged in liquid 106, showing angle of attack 110A between direction of movement 107 and chord of blade 122. Leading edge 102 may be sharp or rounded. Not shown, void 114 may extend behind trailing edge 103 multiple times the width of blade 101.

Operation—FIG. 05

To operate this embodiment, blade 101 is moved through liquid 106 in general direction 107 with enough speed and angle of attack 110A such that sufficiently low pressure is created in liquid 106 adjacent to low pressure side 112 to draw in gas 113 to create void 114 in liquid 106 contiguous to low pressure or dry surface 112. The ambient pressure in gas 113 being high enough in void 104 that cavitation cannot occur on low pressure side 112.

Such movement 107 of blade 101 at angle of attack 110 also causes sufficient liquid 106 to be accelerated with high pressure wetted surface 111 alone in general direction 108, to generate required hydrodynamic thrust on blade 101 in substantially the opposite direction 109 that lifts and supports vehicle 117 above liquid 106.

Since blade 101 becomes fully vented from the surface at relatively low speed, and required hydrodynamic thrust or lift is generated by high pressure surface 111 alone, such embodiments are not prone to great fluctuations of required hydrodynamic thrust or lift due to uncontrolled surface venting as speed in direction 107 increases.

Figure 6:
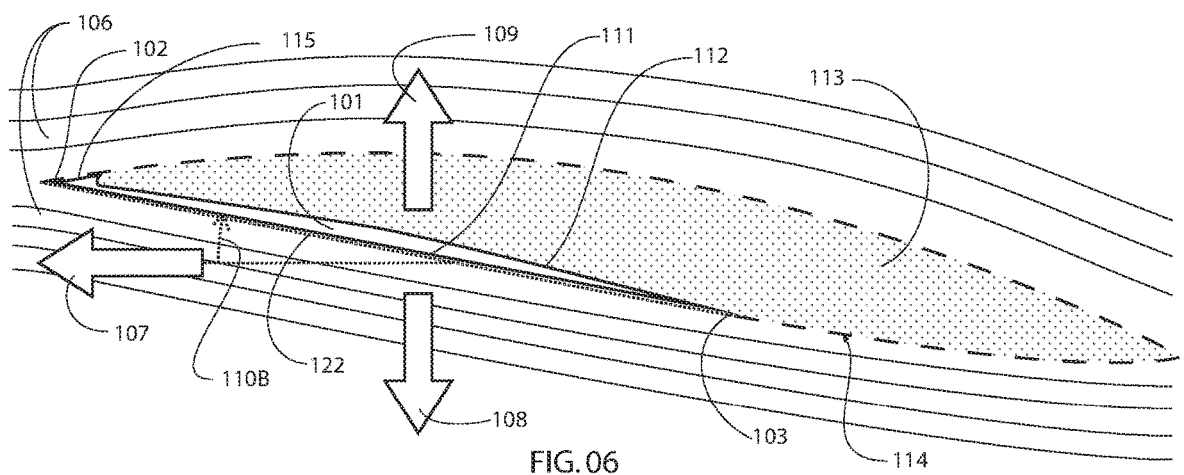

Description—FIG. 06

FIG. 06 shows a similar embodiment as FIG. 05, with the addition of flange 115 at leading edge 102 on low pressure side 112.

Operation—FIG. 06

Operating this embodiment is similar to FIG. 05 with the addition of flange 115 which induces low pressure on side 112 to draw in gas 113 at a lower angle of attack 110B and at lower speeds than the embodiment of FIG. 05.

Figure 7:
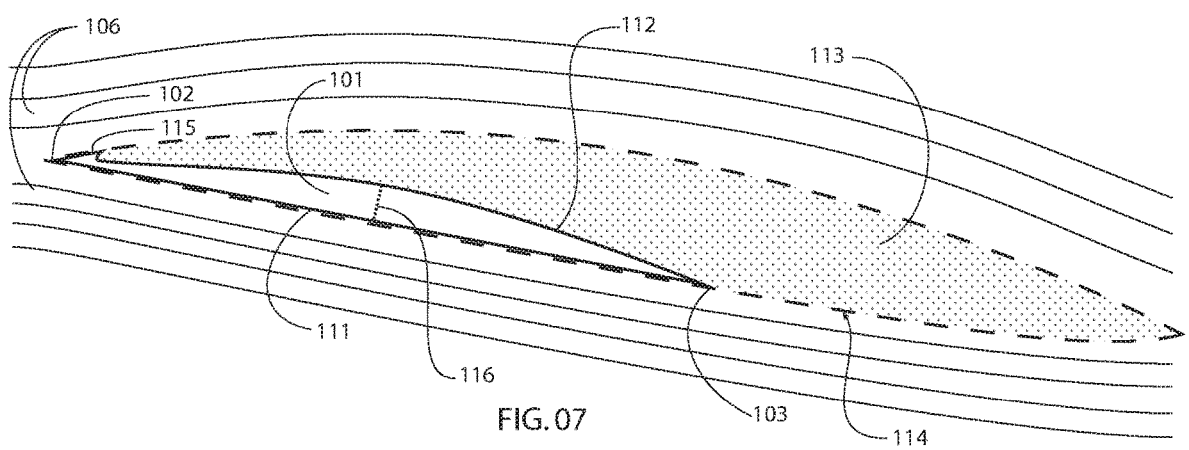

Description—FIG. 07

FIG. 07 shows an embodiment with the addition of increased thickness 116 of blade 101.

Operation—FIG. 07

Operating this embodiment is similar to previous embodiments with the addition of structural strength provided by increased thickness 116, which also allows blade 101 to produce required hydrodynamic lift or thrust, at a speed below that which draws in gas 113 to create void 114, similar to the known ability of a conventional hydrofoil.

Description—FIGS. 08 Through 11

Figure 8:
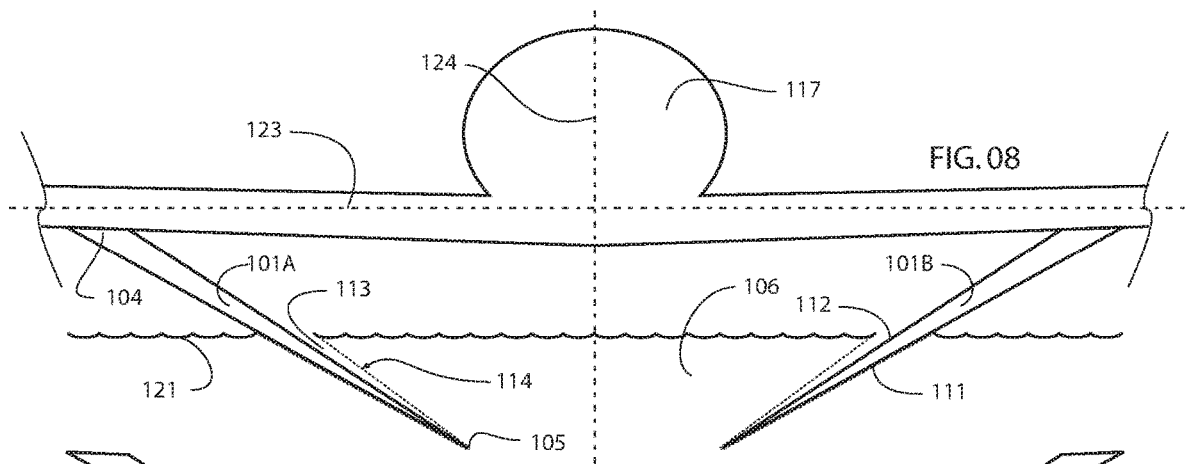
FIGS. 08-14 show possible front end elevation illustrations of possible embodiments of this invention where the blades lift an aircraft or vessel out of the water.
Figure 8A:
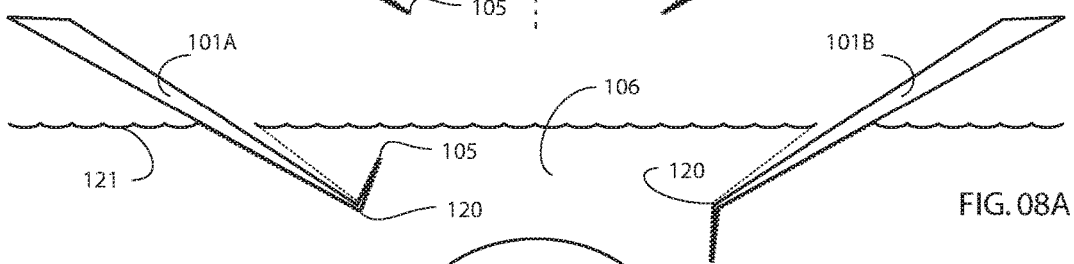
Figure 9:
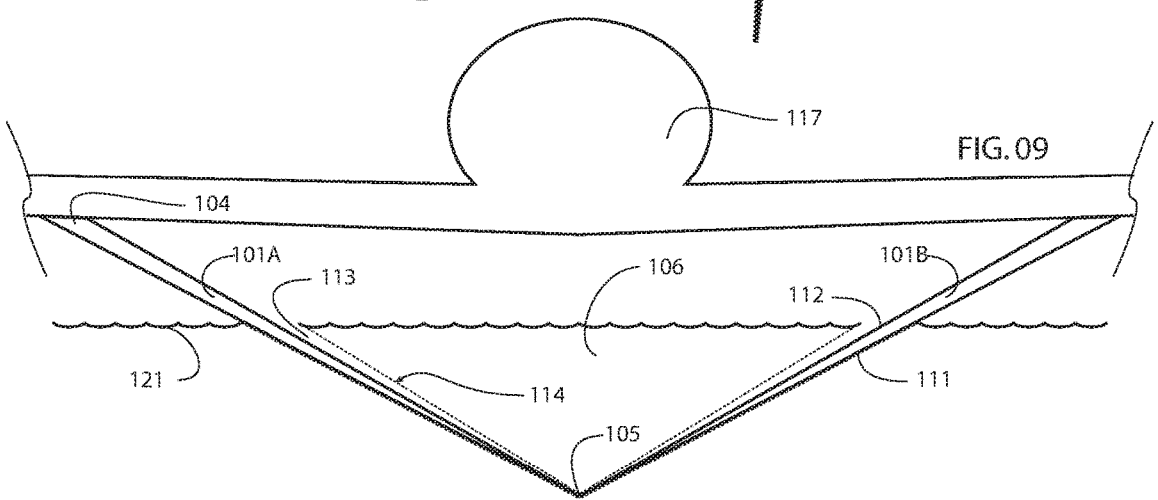
Figure 10:
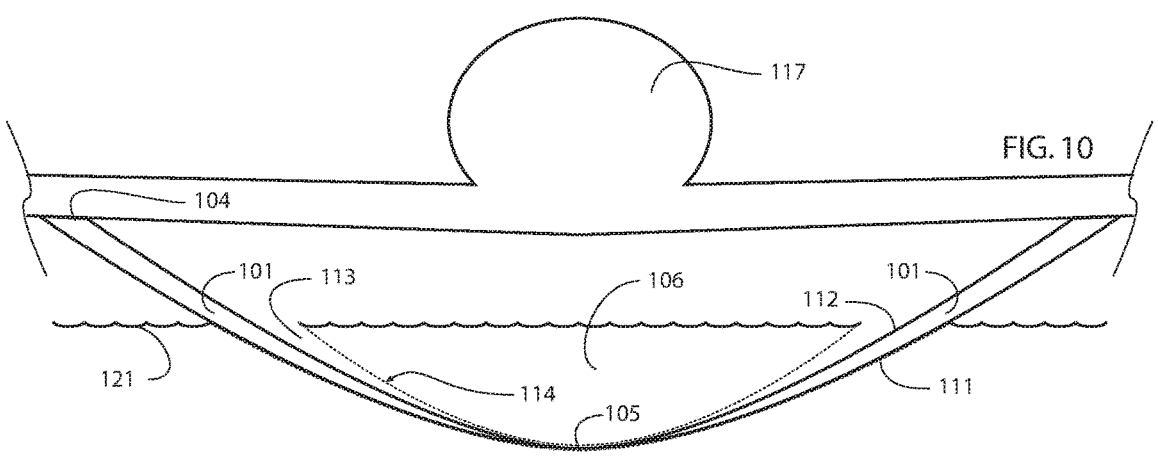

FIGS. 08 through 11 show possible front end elevations of embodiments of this invention with vehicle 117 attached to blade 101A and blade 101B which are piercing surface of liquid 121, and with void 114 in liquid 106 surrounding gas 113 and blades 101. FIG. 08A shows possible embodiments with blade 101 angled at bend 120 to provide additional lateral stability. FIG. 9 shows blades 101 attached at tips 105 to form a "V" and FIG. 10 shows blades 101 attached at tips 105 to form a continuous arc.

Operation—FIGS. 08 Through 11

Figure 11:
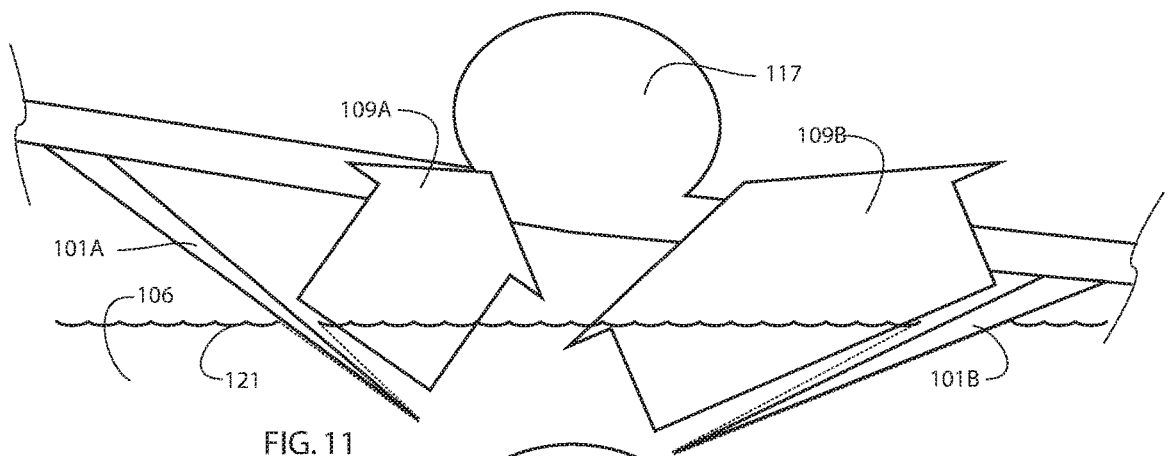

To operate these embodiments, blades 101A and 101B are moved through liquid 106 creating a high pressure and a low pressure in liquid 106 such that gas 113 is drawn onto low pressure side 112 to create void 114 in liquid 106, with enough speed to plane on the high pressure or planing surface 111, whereby deflecting liquid 106 with enough force to provide hydrodynamic thrust on blade 101 to lift object 117 above liquid 106. As shown in FIG. 11, the dihedral in blades 101A and 101B provide stability about the roll axis as thrust 109A is greatly diminished and thrust 109B greatly increased when object 117 is tilted to one side.

Figure 12:
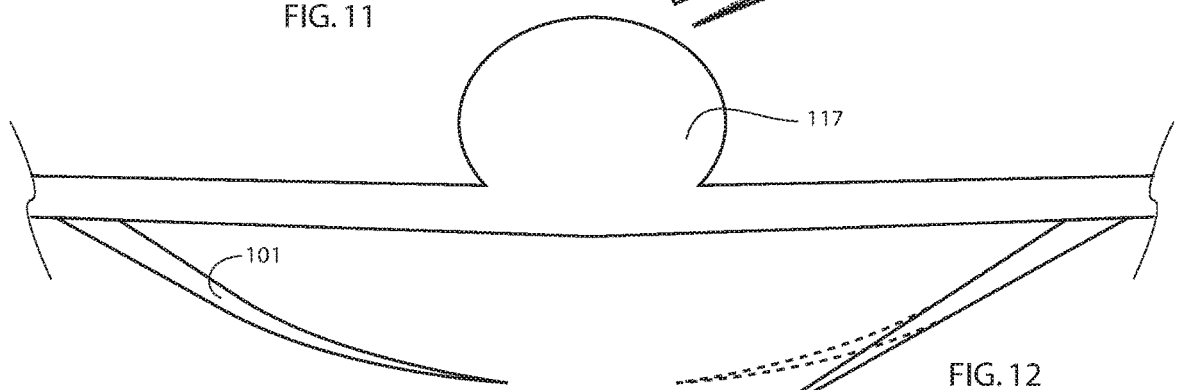
Figure 13:
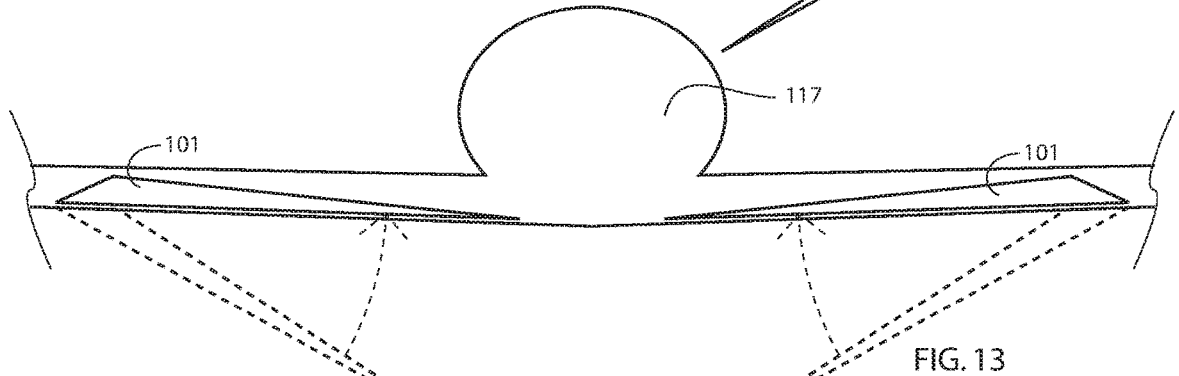
Figure 14:
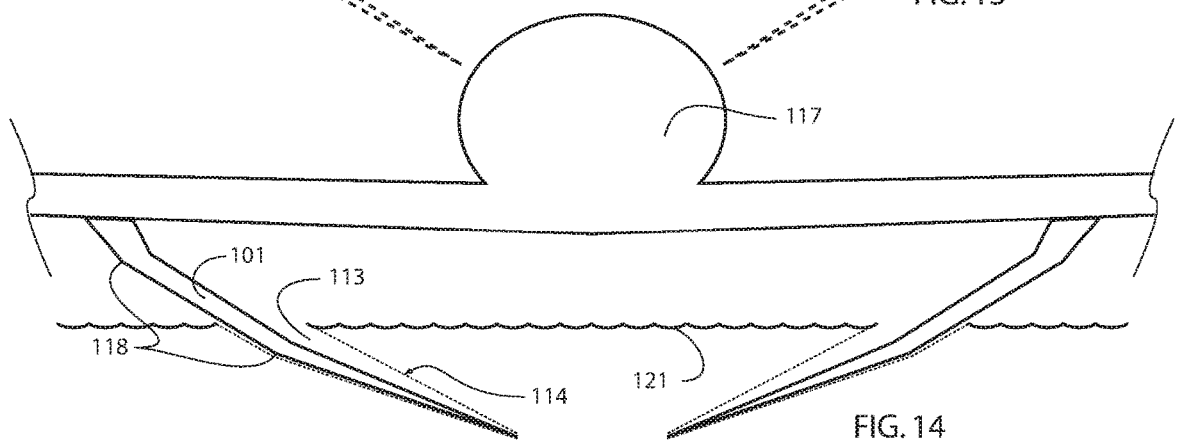

Description—FIGS. 12 Through 14

FIG. 12 shows a possible front-end elevation of embodiments of this invention with blade 101 being curved or flexible.

FIG. 13 shows a possible front-end elevation of embodiments of this invention with blades 101 being retracted into object 117.

FIG. 14 shows a possible front-end elevation of embodiments of this invention with blade 101 having chines.

Operation—FIGS. 12 Through 14

Operation of embodiments shown from FIGS. 12 through 14 is similar to previous embodiments, with FIG. 13 showing the retraction of blades 101 in the case of vehicle 117 being a high speed aircraft such as a turbine powered aircraft. Any retraction method known in the art of retractable landing gear for aircraft may be used.

Figure 15:
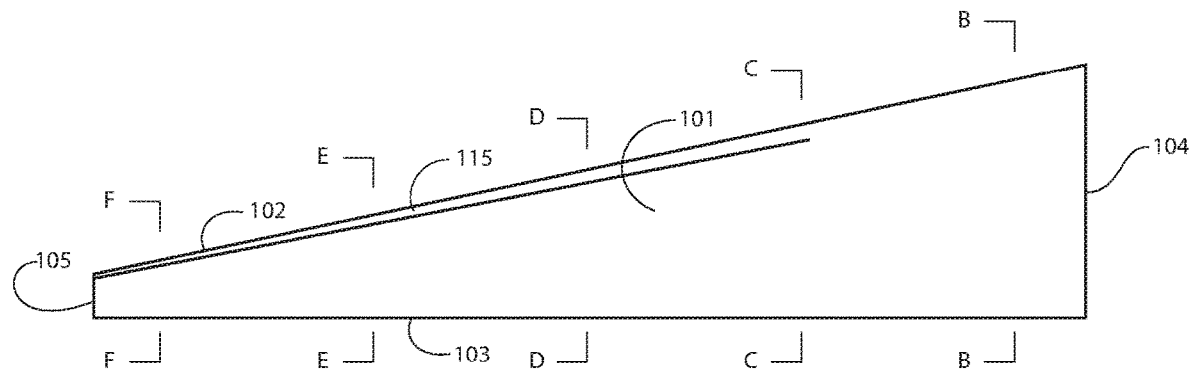
FIGS. 15-17 show possible planar, front end elevations and cross section view illustrations of an embodiment which is a combination of this invention and a conventional hydrofoil.
Figure 16:
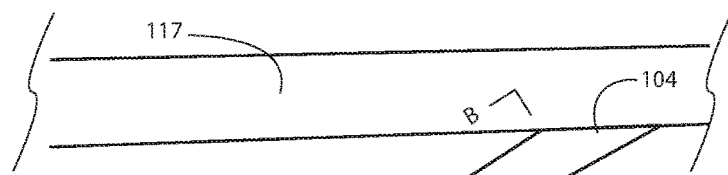
Figure 17:
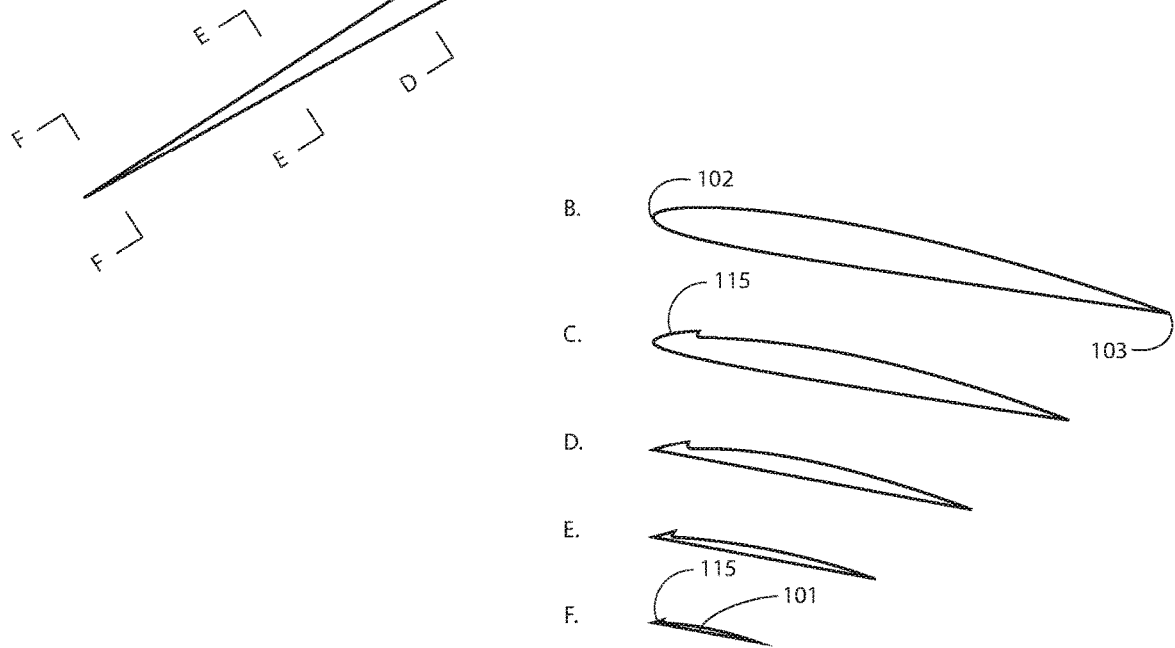

Description—FIGS. 15 Through 17

FIGS. 15 through 17 shows a type of embodiment which is a combination of this invention and a conventional hydrofoil, where part of blade 101 has a cross section similar to a conventional hydrofoil at B, and sections C through F show a progression of the transition to a single high speed wetted surface as shown in this invention.

Operation—FIGS. 15 Through 17

Because a conventional hydrofoil known in the art has better lifting properties at low speed, a combination is presented whereby the upper portion of blade 101 can give more efficient lift at low speeds and the lower portion of blade 101 will become fully vented and operate in accordance with the operation of FIGS. 05 through 07 at high speeds.

Figure 18:
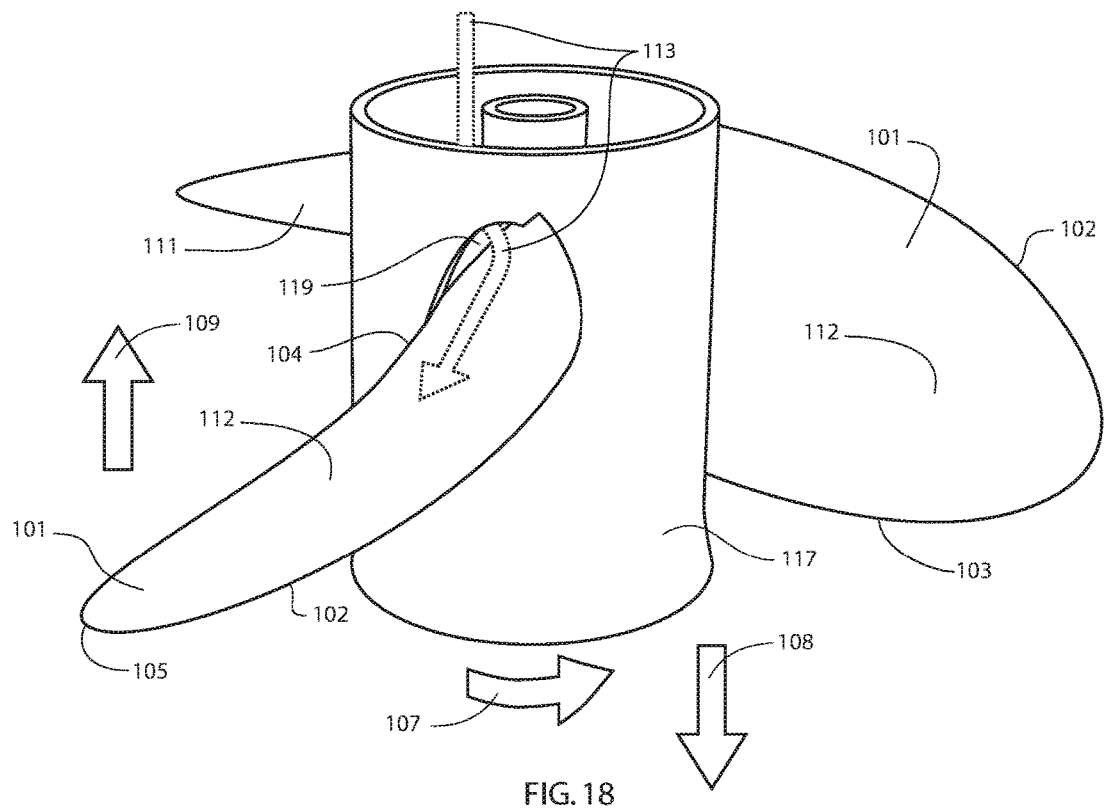
FIGS. 18-19 show possible perspective view illustrations of embodiments which are boat propellers.
Figure 19:
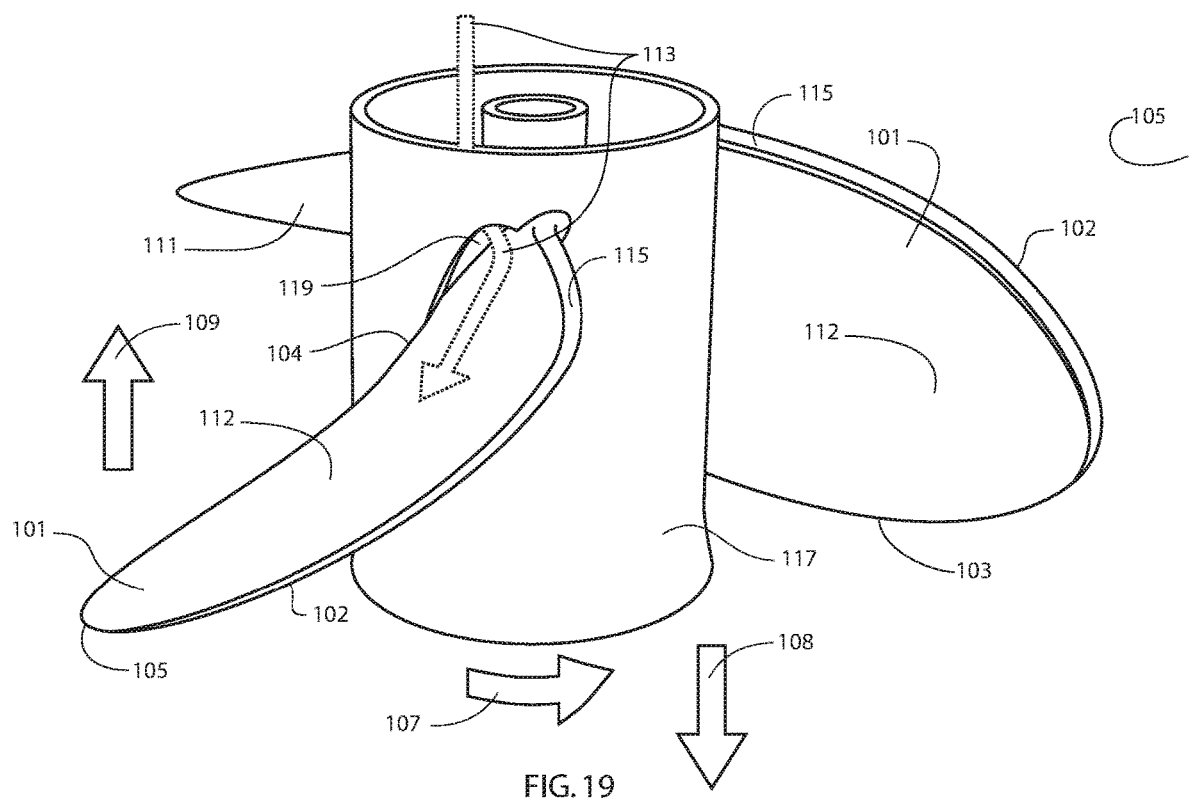

Description—FIGS. 18 Through 19

FIGS. 18 through 19 show an embodiment of this invention where blade 101 is the blade of a propeller, and gas 113 can be exhaust gas or surface air that passes through gas passage 119 to create void 114 (not shown) in liquid 106 (not shown). FIG. 18 has the addition of flange 115.

Operation—FIGS. 18 Through 19

Operation of these embodiments is similar to previous embodiments, where blade 101 is moved through liquid 106 (not shown) creating a high pressure and a low pressure in liquid 106 (not shown) such that gas 113 is and is drawn through gas passage 119 onto low pressure side 112, to create void 114 (not shown) in liquid 106 (not shown), whereby allowing blade 101 to exceed the speed where cavitation is typical and also operate near or at the liquid surface without creating sudden loss of thrust due to surface venting.

Figure 20:
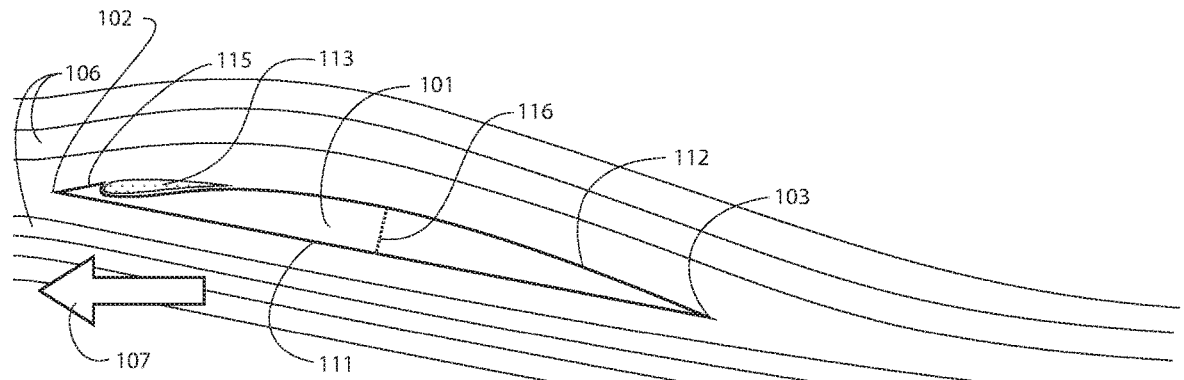
FIGS. 20-22 show possible cross section illustrations of embodiments that can operate as a hydrofoil at low speeds and as a high speed blade in accordance with the invention.
Figure 21:
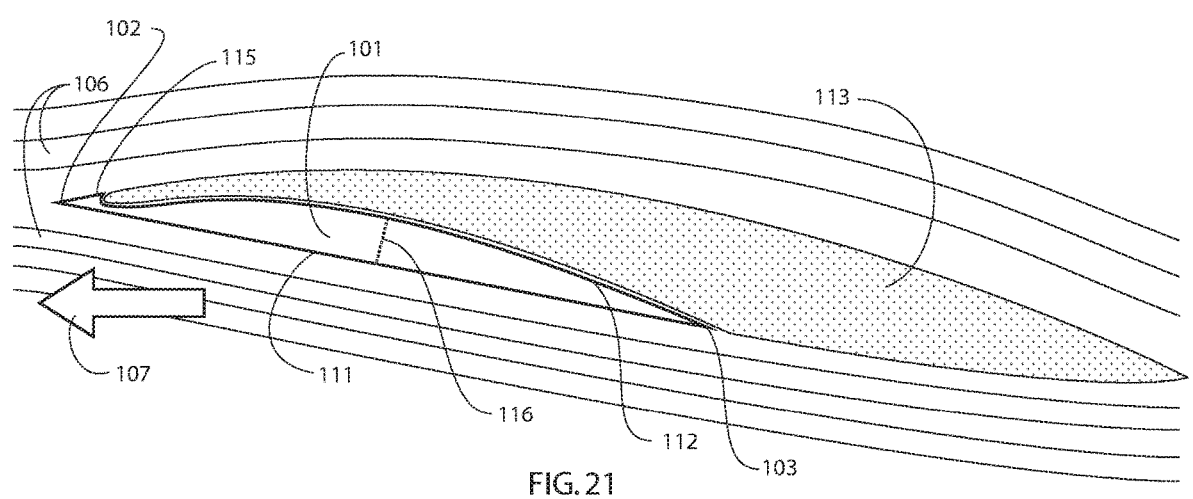
Figure 22:
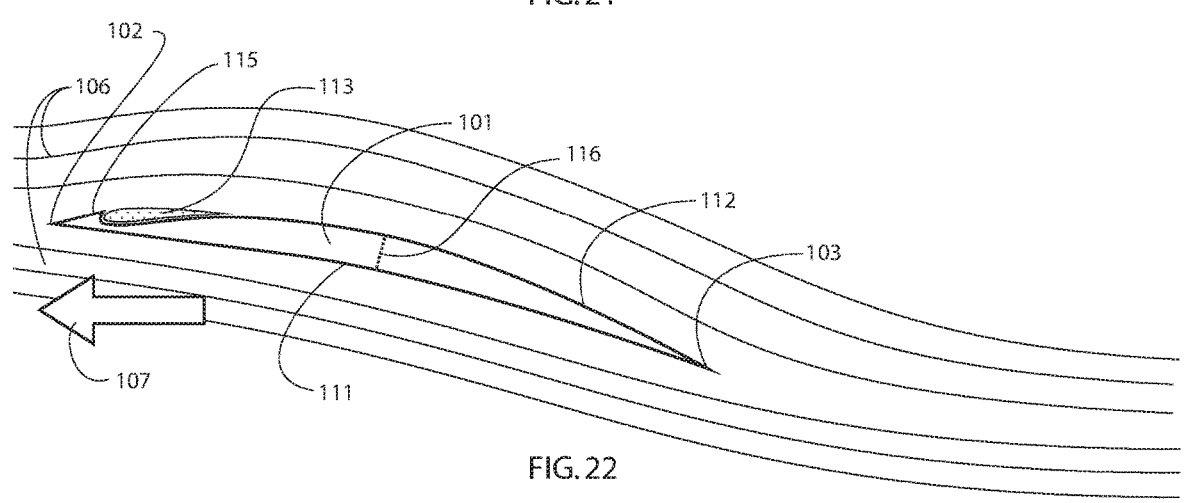

Description—FIGS. 20 Through 22

FIGS. 20 and 21 show an embodiment which is another combination of this invention and a conventional hydrofoil, where blade 101 has increased thickness 116 such that the after part of blade 101 has a cross section typical of a conventional hydrofoil.

FIG. 22 shows blade 101 with surface 111 as concave. Not shown, surface 111 may be convex or a combination of both concave and convex, Operation—FIGS. 20 Through 22

Because a conventional hydrofoil known in the art may have better lifting properties at low speed, a combination is presented to provide hydrodynamic lift when blade 101 is traveling in direction 107 at low speed as in FIG. 20. A small amount of gas 113 may be drawn in behind flange 115 to complete the hydrofoil shape. This space may also be filled with an eddy of liquid 106.

FIG. 21 shows the same embodiment as FIG. 20 with blade 101 traveling in direction 107 at high speed and providing required hydrodynamic lift in accordance with this invention.

Figure 23:
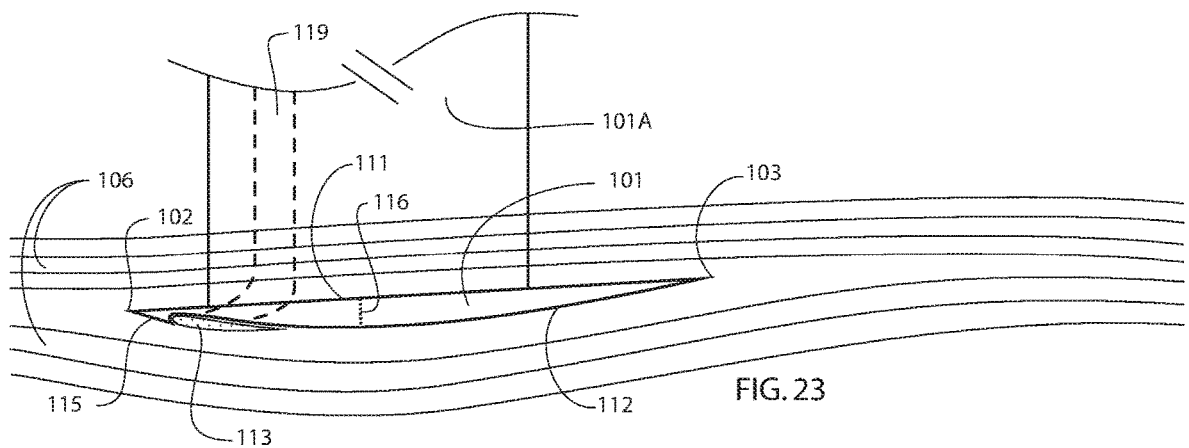
FIGS. 23-24 show possible side view illustrations of the embodiment in FIGS. 20-22 that is inverted and attached to a pylon or boat rudder.
Figure 24:
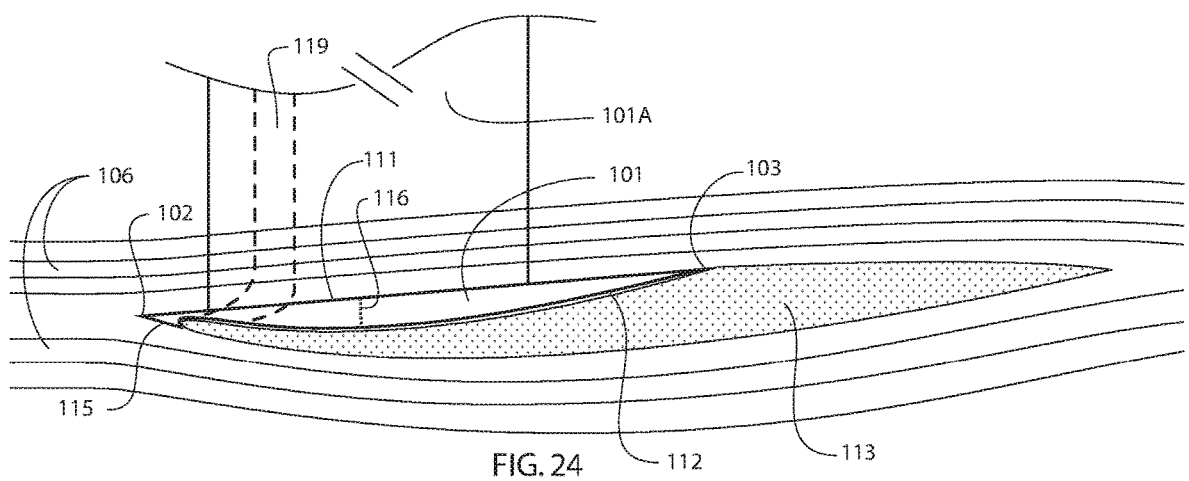

Description—FIGS. 23 Through 24

FIGS. 23 and 24 show an embodiment of this invention where blade 101 is attached perpendicularly to another blade 101C, such that it may be inverted to provide a downward thrust. Blade 101C may have gas passage 119 to supply gas 113 to low pressure side 112.

Operation—FIGS. 23 Through 24

This embodiment is operated much the same as in FIGS. 20 and 21, but providing down thrust at both low speed and high speed, gas 113 being drawn in through gas passage 119.

Figure 25:
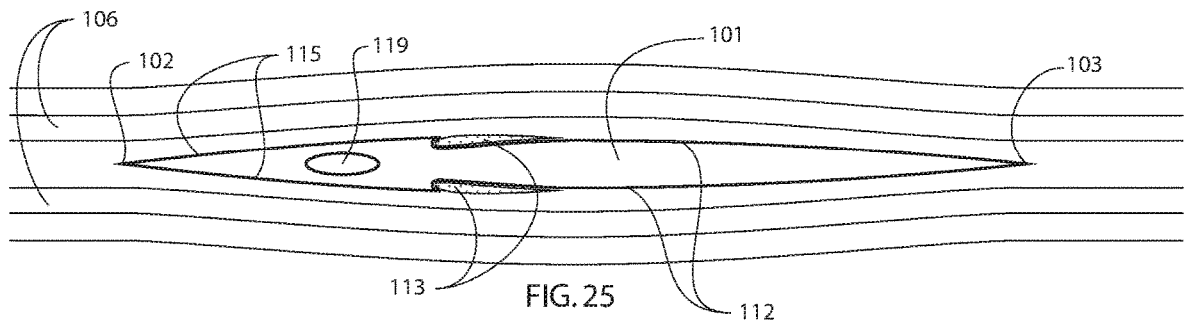
FIGS. 25-26 show possible top view illustrations of an embodiment as a pylon or boat rudder, traveling at both low speed and high speed respectively.
Figure 26:
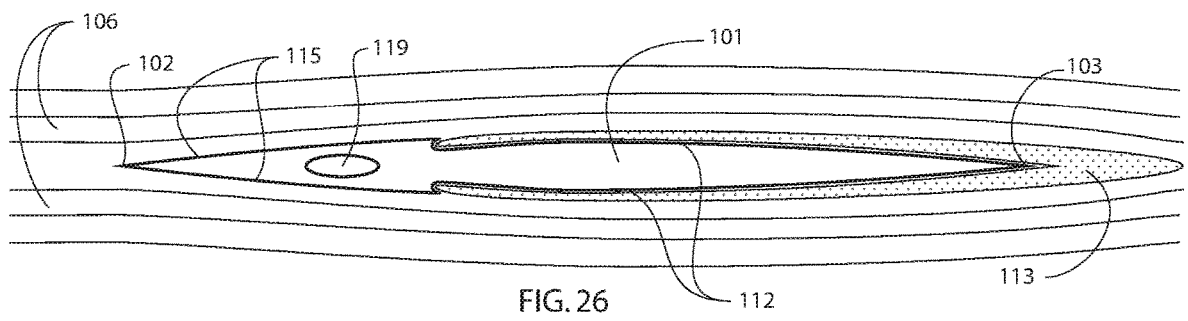

Description—FIGS. 25 and 26

FIGS. 25 and 26 show an embodiment of this invention where blade 101 is symmetrical about the forward and aft axis, both sides being similar to low pressure surface 112 with flange 115. When used vertically as a ruder or pylon as with blade 101A in FIGS. 23 and 24, gas 113 may be drawn in through gas passage 119.

Operation—FIGS. 25 Through 26

This embodiment may be operated at both high speed and low speed, with neutral thrust in either direction, with gas 113 being draw in to prevent cavitation on either side.

Figure 27:
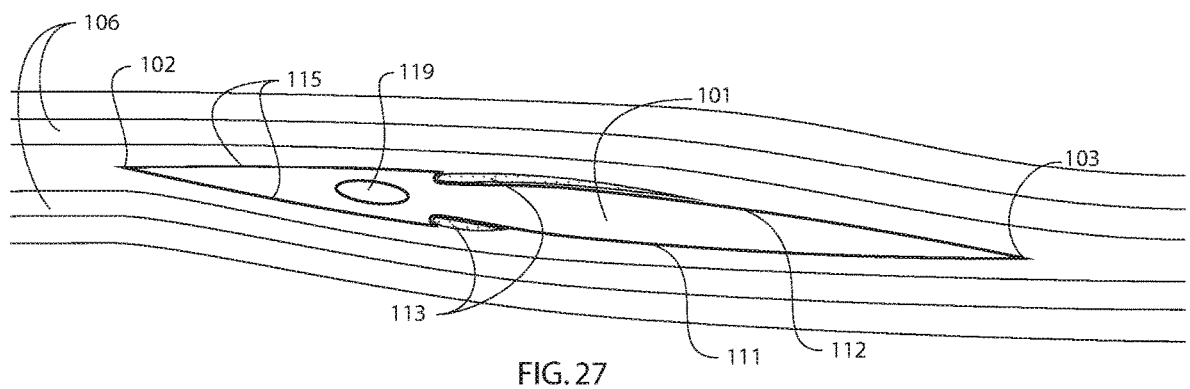
FIGS. 27-28 show possible top view illustrations of an embodiment as a pylon or boat rudder, traveling at both low speed and high speed respectively with deflection of liquid to one side.
Figure 28:
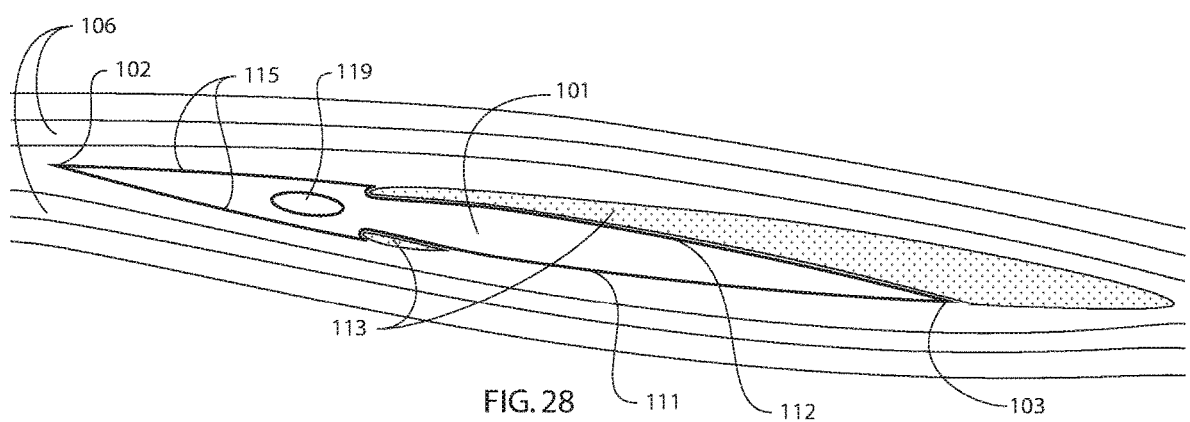

Description—FIGS. 27 and 28

FIGS. 27 and 28 show the same embodiment as FIGS. 25 and 26 where blade 101 can be angled to provide thrust to one side or the other as in the case of a rudder or center board.

Operation—FIGS. 27 Through 28

This embodiment may be operated to provide thrust to one side or the other at both high speed and low speed, with gas 113 being draw in to prevent cavitation on either side.

Figure 29:
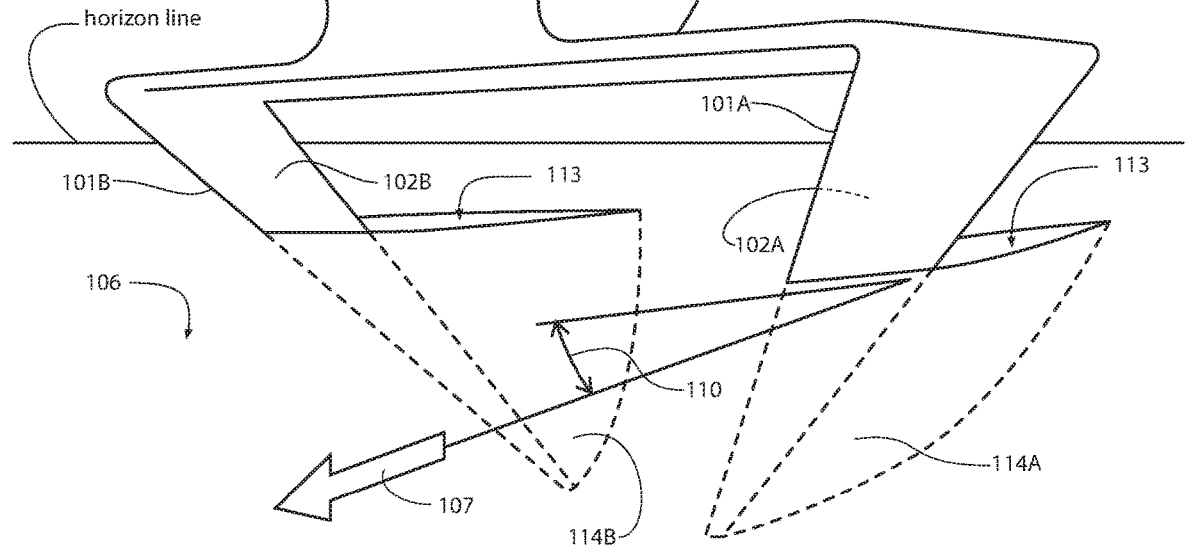
FIG. 29 show possible perspective view illustrations of an embodiment of this invention where the blades lift a high speed vehicle above the water.

Description—FIG. 29

FIG. 29 shows a section of a high-speed vehicle 117, as a perspective view illustration of an embodiment of this invention (fore and aft sections of vehicle 117 not shown), supported by blades 101A and 101B, moving at high speed in liquid 106 in generally direction 107. Dashed lines show blades 101A and 101B, and voids 114A and 114B in liquid 106.

Operation—FIG. 29

To operate this embodiment, blades 101A and 101B are moved through liquid 106 in general direction 107 by high-speed watercraft vehicle 117, at a predetermined speed and having a predetermined angle of attack 110 (only shown on blade 101A but mirrored on blade 101B) such that sufficiently low pressure is created in liquid 106 adjacent to low pressure sides 112A and 112B, to draw in gas 113 to create voids 114A and 114B in liquid 106 contiguous to low pressure surfaces 112A and 112B. The ambient pressure in gas 113 being high enough in void 104 that cavitation cannot occur on low pressure side 112.

Figure 30:
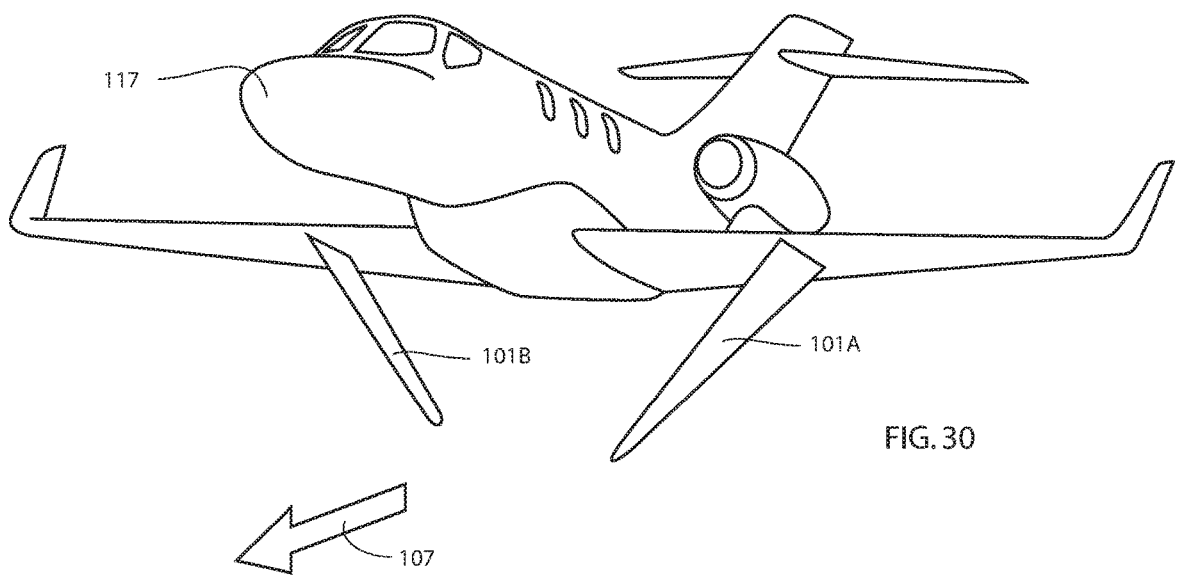
FIG. 30 show possible perspective view illustrations of an embodiment of this invention where the blades lift an aircraft above the water.

Description—FIG. 30

FIG. 30 shows a perspective view illustration of an embodiment similar to the embodiment sown in FIG. 08, as a system or method of allowing high-speed aircraft 117 to take off from, and alight on water using retractable blades 101A and 101B of the type set forth in this invention.

Operation—FIG. 30

Operation of this embodiment is similar to previous embodiments of this invention, where fully vented blades 101A and 101B are moved through liquid 106 (not shown), in general direction 107 at a predetermined speed to raise the aircraft 117 to sufficient altitude above surface 121 (not shown), so that enough speed can be achieved by aircraft 117 to produce flight. Once airborne, the blades 101A and 101B can be retracted into aircraft 117 (not sown) in order to reduce parasitic drag of blades 101A and 101B that can affect the speed of aircraft 107 in flight. Bend 120A and 120B may be included to provide additional lateral or directional stability

I claim:

1. A vehicle having a general direction of movement relative to a liquid that has a surface, said surface being essentially a free surface shared with a gas, said gas being at an ambient pressure, and said general direction of movement being substantially parallel to said surface, comprising:
   a. said vehicle having a reference base plane established as a mean waterline plane when said vehicle is floating at rest at said liquid's surface, and a centerline reference plane extending along a central longitudinal axis and being perpendicular to said reference base plane,
   b. said vehicle having at least one pair of blades, said pair of blades comprising two individual blades opposing one another about said centerline reference plane, and said pair of blades extending downward from a lower portion of said vehicle on substantially dihedrally intersecting planes, each of said blades having a base, a tip, a leading edge, a trailing edge, a top side and a bottom side, each one of said leading edges and respective said trailing edges converging toward respective said tips, said blades being substantially narrower at said tips than at said bases, and each one of said top sides and respective said bottom sides converging at respective said leading edges and at respective said trailing edges,
   c. said pair of blades having attachments to said vehicle at predetermined points such that said bases of said pair of blades are further from said centerline reference plane than said tips, and such that in operation said pair of blades extend downward toward said tips and penetrate said liquid's surface at an acute angle defined respectively between said leading edges and substantially said liquid's surface,
   d. said pair of blades having an angle of attack defined respectively by an angle between said general direction of movement of said vehicle and a chord of said blades, and said pair of blades being configured such that in operation an exposed portion of said pair of blades is above said liquid's surface, and a submerged portion of said pair of blades is below said liquid's surface, and such that said leading edges part said liquid at said submerged portion,
   e. said pair of blades being configured such that in operation at a predetermined speed, said angle of attack provides a high pressure in said liquid on said submerged portion of said bottom sides of said pair of blades and a low pressure in said liquid on said top sides of said pair of blades that is below said liquid's surface, said low pressure being substantially low enough to draw down said gas from said liquid's surface, said gas being essentially drawn down contiguous to said top sides, and said gas creating voids in said liquid contiguous to said top sides, said voids being filled with said gas at substantially said ambient pressure, and in operation said voids being able to extend behind said pair of blades in said liquid, and each of said submerged portions of said bottom sides of said pair of blades being essentially a wetted high pressure surface, and each of said top sides being essentially an ambient pressure dry surface, whereby said pair of blades are in a vented state, and whereby said vented state prevents cavitation of said pair of blades,
   f. said angle of attack being further configured such that in operation, at said predetermined speed, said high pressure on said wetted high pressure surfaces provide sufficient hydrodynamic thrust to said pair of blades that said pair of blades rise substantially perpendicularly relative to said liquid's surface, and support part or all of said vehicle at a predetermined height above said liquid's surface, and such that an increase in said predetermined speed will increase said hydrodynamic thrust, whereby increasing said predetermined height of said vehicle above said liquids surface, reducing said portion of said blades that is submerged, and whereby reducing said wetted surface, and
   g. said dihedrally intersecting planes configured such that in operation, said pair of blades provide a righting moment to said vehicle when said vehicle is rolled sideways relative to said longitudinal axis, causing one of said blades to be a lower blade and one of said blades to be a higher blade, whereby respectively increasing said wetted high pressure surface on said lower blade and decreasing said wetted high pressure surface on said higher blade, thus increasing said hydrodynamic thrust of said lower blade and decreasing said hydrodynamic thrust of said higher blade, whereby causing a differential of said hydrodynamic thrust on said pair of blades, said differential providing said righting moment to said vehicle.

2. The vehicle of claim 1 further including a deflector flange at a predetermined section of said leading edges on said top sides of said pair of blades, said deflector flange configured such that in operation, said deflector flange deflects said liquid away from said top sides, whereby substantially reducing said predetermined speed and said predetermined angle of attack required to provide said low pressure to draw down said gas from said surface to create said voids in said liquid contiguous to said top sides.

3. The vehicle of claim 1 wherein said vehicle is an aircraft configured such that in operation at said predetermined speed, said hydrodynamic thrust of at least one of said pair of blades substantially supports part or all of said aircraft above said surface of said liquid, whereby said increase in said speed can be maintained until flight of said aircraft is achieved.

4. The vehicle of claim 1 wherein said attachments of said pair of blades to said vehicle comprise mechanisms which allow said pair of blades to be retracted into said vehicle.

5. The vehicle of claim 1 wherein said leading edges and said trailing edges of said pair of blades are sharp, rounded or a combination thereof.

6. The vehicle of claim 1 wherein said top sides and said bottom sides of said pair of blades are planar, convex, concave or a combination thereof.

7. The vehicle of claim 1 further comprising means for adjusting said angle of attack of said pair of blades during operation.

8. The vehicle of claim 1 wherein said angle of attack of said pair of blades varies between said base and said tip.

9. The vehicle of claim 1 wherein said pair of blades are attached at said tips to form a "V" shape.

10. The vehicle of claim 1 wherein said pair of blades are attached at said tips to form an arc.

11. The vehicle of claim 1 wherein an upper section of said pair of blades resembles a non-cavitating and non-venting hydrofoil.

12. The vehicle of claim 1 wherein said pair of blades are flexible, whereby said pair of blades can flex in accordance with a variation of said hydrodynamic thrust caused by said surface of said liquid being uneven due to waves or swell.

13. The vehicle of claim 1 wherein said pair of blades are curved at one or more places.

14. The vehicle of claim 1 where said tips of said pair of blades are bent at a predetermined angle and configured such that in operation said bent tips cause substantial resistance to lateral movement of said blades, whereby increasing stability of said vehicle.

15. A method for providing lift to a vehicle having a general direction of movement relative to a liquid that has a surface, said surface being essentially a free surface shared with a gas, said gas being at an ambient pressure, and said general direction of movement being substantially parallel to said surface, comprising:
   a. said vehicle having a reference base plane established as a mean waterline plane when said vehicle is floating at rest at said liquid's surface, and a centerline reference plane extending along a central longitudinal axis and being perpendicular to said reference base plane,
   b. providing at least one pair of blades, said pair of blades comprising two individual blades opposing one another about said centerline reference plane, and said pair of blades extending downward from a lower portion of said vehicle on substantially dihedrally intersecting planes, each of said blades having a base, a tip, a leading edge, a trailing edge, a top side and a bottom side, each one of said leading edges and respective said trailing edges converging toward respective said tips, said blades being substantially narrower at said tips than at said bases, and each one of said top sides and respective said bottom sides converging at respective said leading edges and at respective said trailing edges,
   c. providing said pair of blades having attachments to said vehicle at predetermined points such that said bases are further from said centerline reference plane than said tips, such that in operation said pair of blades extend downward toward said tips and penetrate said liquid's surface at an acute angle defined respectively between said leading edges and substantially said liquid's surface,
   d. providing an angle of attack to said pair of blades, said angle of attack defined respectively by an angle between said general direction of movement of said vehicle and a chord of said blades, and said pair of blades being configured such that in operation an exposed portion of said pair of blades is above said liquid's surface, and a submerged portion of said pair of blades is below said liquid's surface, and such that said leading edges part said liquid at said submerged portion,
   e. said angle of attack providing, at a predetermined speed, a high pressure in said liquid on said submerged portion of said bottom sides of said pair of blades and a low pressure in said liquid on said top sides of said pair of blades that is below said liquid's surface, said low pressure being substantially low enough to draw down said gas from said liquid's surface, said gas being essentially drawn down contiguous to said top sides, and said gas creating voids in said liquid contiguous to said top sides, said voids being filled with said gas at substantially said ambient pressure, and in operation said voids being able to extend behind said pair of blades in said liquid, and each of said submerged portions of said bottom sides of said pair of blades being essentially a wetted high pressure surface, and each of said top sides being essentially an ambient pressure dry surface, whereby said pair of blades are operated in a vented state, and whereby said vented state prevents cavitation of said pair of blades,
   f. said angle of attack further providing, at said predetermined speed, sufficient hydrodynamic thrust to said pair of blades from said high pressure on said wetted high pressure surfaces that said pair of blades rise substantially perpendicularly relative to said liquid's surface, and support part or all of said vehicle at a predetermined height above said liquid's surface, and such that an increase in said predetermined speed will increase said hydrodynamic thrust, whereby increasing said predetermined height of said vehicle above said liquids surface, reducing said portion of said blades that is submerged, and whereby reducing said wetted surface, and
   g. said pair of blades further provide a righting moment to said vehicle when said vehicle is rolled sideways relative to said longitudinal axis, causing one of said blades to be a lower blade and one of said blades to be a higher blade, whereby respectively increasing said wetted high pressure surface on said lower blade and decreasing said wetted high pressure surface on said higher blade, thus increasing said hydrodynamic thrust of said lower blade and decreasing said hydrodynamic thrust of said higher blade, whereby causing a differential of said hydrodynamic thrust on said pair of blades, said differential providing said righting moment to said vehicle.

16. The method of claim 15 wherein said vehicle is an aircraft operated at said predetermined speed, where said hydrodynamic thrust of at least one of said pair of blades substantially supports part or all of said aircraft above said surface of said liquid, whereby said increase in said speed can be maintained until flight of said aircraft is achieved.

17. The method of claim 15 wherein said attachments of said pair of blades to said vehicle comprise mechanisms which allow said pair of blades to be retracted into said vehicle.

18. The method of claim 15 further providing a deflector flange at a predetermined section of said leading edges on said top sides of said pair of blades, said deflector flange configured such that in operation, said deflector flange deflects said liquid away from said top sides, whereby substantially reducing said predetermined speed and said predetermined angle of attack required to provide said low pressure to draw down said gas from said surface to create said voids in said liquid contiguous to said top sides.

* * * * *

UNITED STATES PATENT AND TRADEMARK OFFICE
CERTIFICATE OF CORRECTION

Page 1 of 1

PATENT NO. : 10,926,837 B2
APPLICATION NO. : 15/303203
DATED : February 23, 2021
INVENTOR(S) : Shaun Pritchard It is certified that error appears in the above-identified patent and that said Letters Patent is hereby corrected as shown below:

On the Title Page

Item [54], Column 1, Line 1:
Delete "SUBMERGED PLANING SURFACE THAT PROVIDES HYDRODYNAMIC LIFT IN A LIQUID AT HIGH SPEED"
Insert --SUPERVENTILATED SURFACE-PIERCING HYDROFOILS--

Signed and Sealed this
Fourth Day of May, 2021

Drew Hirshfeld
*Performing the Functions and Duties of the
Under Secretary of Commerce for Intellectual Property and
Director of the United States Patent and Trademark Office*